US011424664B2

(12) United States Patent
Sakurada et al.

(10) Patent No.: US 11,424,664 B2
(45) Date of Patent: Aug. 23, 2022

(54) METHOD FOR MANUFACTURING STATOR FOR ELECTRIC ROTARY MACHINE

(71) Applicant: HONDA MOTOR CO., LTD., Tokyo (JP)

(72) Inventors: Manabu Sakurada, Saitama (JP); Shogo Nomura, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 481 days.

(21) Appl. No.: 16/494,079

(22) PCT Filed: Mar. 15, 2018

(86) PCT No.: PCT/JP2018/010326
§ 371 (c)(1),
(2) Date: Sep. 13, 2019

(87) PCT Pub. No.: WO2018/169017
PCT Pub. Date: Sep. 20, 2018

(65) Prior Publication Data
US 2020/0136480 A1 Apr. 30, 2020

(30) Foreign Application Priority Data
Mar. 17, 2017 (JP) .............................. JP2017-052174

(51) Int. Cl.
*H02K 15/02* (2006.01)
*H02K 15/12* (2006.01)
(Continued)

(52) U.S. Cl.
CPC ........... *H02K 15/024* (2013.01); *H02K 1/165* (2013.01); *H02K 15/12* (2013.01); *H02K 15/14* (2013.01);
(Continued)

(58) Field of Classification Search
CPC . H02K 15/024; H02K 15/12; Y10T 29/49009
See application file for complete search history.

(56) References Cited

U.S. PATENT DOCUMENTS

2016/0036291 A1\* 2/2016 Yabe ........................ H02K 5/24
310/89

FOREIGN PATENT DOCUMENTS

JP H03-124247 A 5/1991
JP H05-304742 A 11/1993
(Continued)

OTHER PUBLICATIONS

Goraj, Robert & Spagnolo, Aristide. (2015). Rotor Dynamics and Stator Vibrations of a Novel IPM Synchronous Motor. Mechanics and Control. 34. 9. (Year: 2015).\*
(Continued)

*Primary Examiner* — Livius R. Cazan
(74) *Attorney, Agent, or Firm* — Paratus Law Group, PLLC

(57) ABSTRACT

A method for manufacturing a stator for an electric rotary machine including a stator core formed by stacking a plurality of steel plates and a coil attached to the stator core, the method includes forming the steel plates, forming the stator core by stacking and fixing the plurality of steel plates with an adhesive, attaching the coil to the stator core, and changing a stack strength of the stator core, by deteriorating the adhesive such that a bending resonance frequency of the stator does not overlap with a pre-measured circular resonance frequency of the stator, the bending resonance frequency varying depending on the stack strength of the plurality of steel plates.

3 Claims, 3 Drawing Sheets

(51) Int. Cl.
    *H02K 1/16*      (2006.01)
    *H02K 15/14*     (2006.01)
    *H02K 15/00*     (2006.01)

(52) U.S. Cl.
    CPC ......... *H02K 15/00* (2013.01); *H02K 15/0025* (2013.01); *H02K 2201/09* (2013.01); *Y10T 29/49009* (2015.01)

(56) References Cited

FOREIGN PATENT DOCUMENTS

| | | | | |
|---|---|---|---|---|
| JP | 2005-218291 A | 8/2005 | | |
| JP | 2005-269732 A | 9/2005 | | |
| JP | 2017-034790 A | 2/2017 | | |
| WO | WO-2017082392 A1 * | 5/2017 | ............... | H02K 1/18 |

OTHER PUBLICATIONS

May 29, 2018, International Search Report issued for related PCT Application No. PCT/JP2018/010326.
May 29, 2018, International Search Opinion issued for related PCT Application No. PCT/JP2018/010326.
Sep. 1, 2020, Japanese Office Action issued for related JP Application No. 2019-506273.

* cited by examiner

METHOD FOR MANUFACTURING STATOR FOR ELECTRIC ROTARY MACHINE

CROSS REFERENCE TO PRIOR APPLICATION

This application is a National Stage Patent Application of PCT International Patent Application No. PCT/JP2018/010326 (filed on Mar. 15, 2018) under 35 U.S.C. § 371, which claims priority to Japanese Patent Application No. 2017-052174 (filed on Mar. 17, 2017), which are all hereby incorporated by reference in their entirety.

TECHNICAL FIELD

The present invention relates to a method for manufacturing a stator for an electric rotary machine.

BACKGROUND ART

In order to improve the quietness of vehicles equipped with electric rotary machines such as hybrid vehicles and electric vehicles, it is necessary to suppress the excitation force and resonance level of the electric rotary machines. An electric rotary machine described in JP-A-5-304742 has a structure of preventing the magnetic vibration of a stator core from being transmitted to a stator frame (housing), which realizes low vibration.

SUMMARY OF INVENTION

As described above, in order to improve the quietness of vehicles equipped with electric rotary machines, it is necessary to suppress the excitation force and resonance level of the electric rotary machines. Although the electric rotary machine described in JP-A-5-304742 suppresses the excitation force by preventing the magnetic vibration of the stator core from being transmitted, no measures have been taken to reduce the resonance level. However, since the resonance level of the electric rotary machine increases when the two resonance frequencies of ring resonance and bending resonance of the stator overlap each other, a measure for reducing the resonance level is also important to improve quietness.

The ring resonance frequency is determined by the inner diameter, outer diameter and material characteristics of the stator. It is difficult to change a ring resonance frequency in an already designed electric rotary machine because the shape and size of a stator affect the performance of the electric rotary machine. On the other hand, the bending resonance frequency is determined by the stack strength (rigidity) of the steel plate constituting the stator core. However, changing the number of caulking points or changing the welding method in order to change the bending resonance frequency is not preferable because of large-scale remodeling of equipment and deterioration of efficiency such as iron loss of a electric rotary machine. Therefore, a method capable of reducing the resonance level by changing the ring resonance frequency or the bending resonance frequency by an easy method is desired.

According to the present invention, there is provided a method for manufacturing a stator for an electric rotary machine, capable of easily suppressing a resonance level.

The present invention is to provide following aspects.

A first aspect is defined as a method for manufacturing a stator (e.g. a stator 10 in an embodiment as described later) for an electric rotary machine including a stator core (e.g. a stator core 11 in the embodiment as described later) formed by stacking a plurality of steel plates and a coil (e.g. a coil 12 in the embodiment as described later) attached to the stator core, the method comprising:
 forming the steel plates;
 forming the stator core by stacking and fixing the plurality of steel plates; and
 attaching the coil to the stator core, wherein
 in the forming the stator core, the plurality of steel plates are stacked and fixed such that a bending resonance frequency of the stator core expresses a value not overlapping with a pre-measured ring resonance frequency of the stator core, the bending resonance frequency varying depending on a stack strength of the plurality of steel plates.

A second aspect is defined as the method for manufacturing the stator for the electric rotary machine of the first aspect, wherein
 in the forming the stator core, the stack strength of the stator core is adjusted by adjusting the amount of adhesive to be applied to fix the steel plates.

A third aspect is defined as a method for manufacturing a stator (e.g. the stator 10 in an embodiment as described later) for an electric rotary machine including a stator core (e.g. the stator core 11 in the embodiment as described later) formed by stacking a plurality of steel plates and a coil (e.g. the coil 12 in the embodiment as described later) attached to the stator core, the method comprising:
 forming the steel plates;
 forming the stator core by stacking and fixing the plurality of steel plates with an adhesive;
 attaching the coil to the stator core; and
 changing a stack strength of the stator core, by deteriorating the adhesive such that a bending resonance frequency of the stator does not overlap with a pre-measured circular resonance frequency of the stator, the bending resonance frequency varying depending on the stack strength of the plurality of steel plates.

A fourth aspect is defined as the method for manufacturing the stator for the electric rotary machine of the third aspect, wherein
 in the changing the stack strength, the adhesive is deteriorated by a heating temperature when varnish supplied to the stator is cured by heat.

A fifth aspect is defined as the method for manufacturing the stator for the electric rotary machine of the fourth aspect, wherein
 in the changing the stack strength, the adhesive is deteriorated by further heating the stator to a temperature higher than the heating temperature when the varnish is cured by heat.

According to the first aspect, when the stator core is configured, a plurality of steel plates are stacked and fixed such that the bending resonance frequency of the stator core expresses a value not overlapping with the ring resonance frequency. Thus, by adjusting the bending resonance frequency of the stator core in the forming the stator core, the resonance level of the stator can be easily suppressed. As a result, the quietness of the electric rotary machine can be improved.

According to the second aspect, the stack strength of the stator core can be easily changed by adjusting the amount of the adhesive to be applied. That is, since the bending resonance frequency of the stator core can be easily adjusted, the resonance level of the stator can be suppressed by a simple method.

According to the third aspect, the bending resonance frequency of the stator core is changed to a value not overlapping the ring resonance frequency, by deteriorating an adhesive provided between stacked steel plates constituting the stator core. Thus, the resonance level of the stator can be easily suppressed by adjusting the bending resonance frequency of the stator core by changing the stack strength of the stator core by an easy method such as deteriorating the adhesive. As a result, the quietness of the electric rotary machine can be improved.

According to the fourth aspect, the stack strength of the stator core can be easily changed by deteriorating the adhesive for stacking and fixing the steel plate by a heating temperature when the varnish is cured by heat. That is, since the bending resonance frequency of the stator core can be easily adjusted, the resonance level of the stator can be suppressed by a simple method.

According to the fifth aspect, since the adhesive is deteriorated by further heating the stator to a temperature higher than the heating temperature when the varnish is cured by heat, the varnish is discolored. Therefore, the deterioration of the adhesive can be checked by the discoloring of the varnish. That is, the deterioration of the adhesive can be easily checked from the appearance of the varnish.

DESCRIPTION OF EMBODIMENTS

Figure 1:
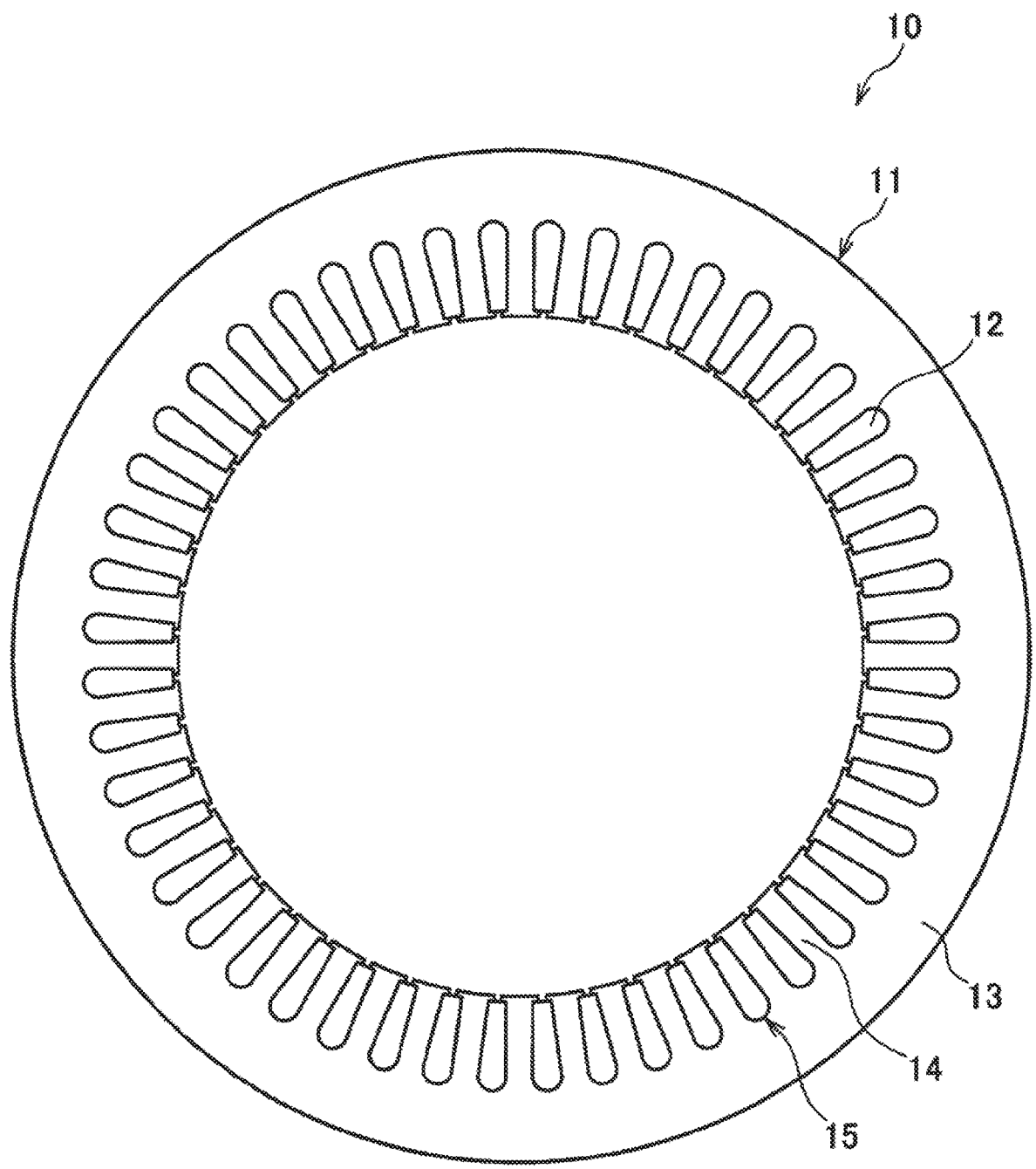
FIG. 1 is a radial sectional view of a stator of a electric rotary machine of an embodiment.

Embodiments of the present invention will be described below with reference to the drawings. The drawings are to be viewed in the direction of the reference numerals.

First Embodiment

FIG. 1 is a radial sectional view of a electric rotary machine of an embodiment. A stator 10 shown in FIG. 1 is combined with a rotor (not shown) provided therein to constitute a electric rotary machine. The electric rotary machine is configured to rotate the rotor by energizing the coil 12 wound around the teeth 14 of the stator 10.

The stator 10 has a stator core 11 and a coil 12. The stator core 11 is formed by stacking a plurality of circular steel plates of approximately the same shape. When a steel plate is stacked, an adhesive is applied to a part of the surface of the steel plate to be opposed to the other steel plate. Therefore, a stator core 11 which is an aggregate of a plurality of steel plates stacked and fixed has a circular cylindrical shape.

Each steel plate constituting the stator core 11 is a plate-like member having an annular stator yoke 13, a plurality of teeth 14 projecting radially inward from the stator yoke 13 at equal intervals, and slots 15 formed circumferentially between the adjacent teeth 14 at equal intervals, which is formed by punching an electromagnetic steel plate or the like. When a plurality of steel plates are stacked, a plurality of slots 15 penetrating in the axial direction are formed in the stator core 11 at equal intervals in the circumferential direction. A coil 12 formed by winding wound around the teeth 14 is attached to the slot 15.

Figure 2:
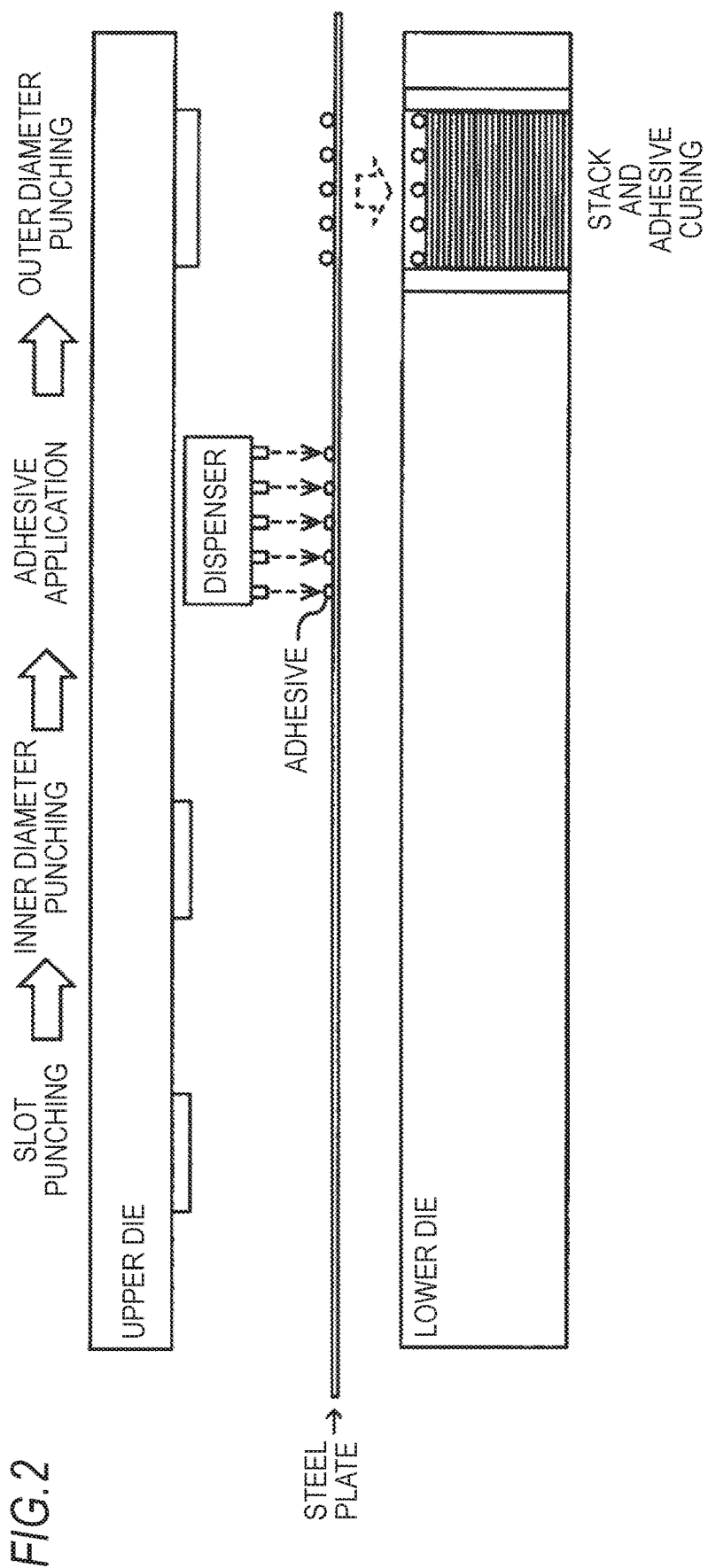
FIG. 2 is a schematic diagram showing steps of forming and stacking steel plates constituting a stator core of a stator of a first embodiment.

FIG. 2 is a schematic diagram showing steps of forming and stacking steel plates constituting the stator core 11 of the stator 10 of a first embodiment. As shown in FIG. 2, a slot is formed by punching the steel plate before stacking, and after an inner diameter is formed, an adhesive is applied to a part of a surface to be opposed to the other steel plate. Thereafter, a circular steel plate with its outer diameter punched is stacked on the other steel plate.

In the present embodiment, the stack strength (rigidity) of the steel plate constituting the stator core 11 is adjusted by the amount of adhesive applied to each steel plate. That is, in the step of "adhesive application" illustrated in FIG. 2, the stack strength of the stator core 11 which is the aggregate of a plurality of steel plates stacked and fixed, by adjusting the amount of adhesive to be applied to a steel plate, that is, the discharge amount of a dispenser. When the stack strength of the stator core 11 is changed, the bending resonance frequency of the stator core 11 is changed. On the other hand, the ring resonance frequency of the stator core 11 is determined by the inner diameter, outer diameter and material characteristics of the stator core 11. In the present embodiment, an adhesive is applied to a steel plate in an amount expressing a bending resonance frequency of a value not overlapping with the ring resonance frequency of the stator core 11 where a predetermined number of steel plates are stacked. As a result, the ring resonance frequency of the stator core 11 does not overlap with the bending resonance frequency, so the resonance level of the stator 10 is suppressed and the quietness of the electric rotary machine is improved.

As described above, in the present embodiment, when the stator core 11 is configured, the amount of adhesive to be applied to a steel plate is adjusted such that the bending resonance frequency of the stator core 11 does not overlap with the ring resonance frequency. Thus, the stack strength of the stator core can be easily changed by adjusting the amount of the adhesive. That is, since the bending resonance frequency of the stator core 11 can be easily adjusted, the resonance level of the stator can be suppressed by a simple method. As a result, the quietness of the electric rotary machine can be improved.

Second Embodiment

Similar to the first embodiment, a stator of s second embodiment is combined with a rotor (not shown) provided therein to constitute a electric rotary machine. The electric rotary machine is configured to rotate the rotor by energizing the coil wound around the teeth of the stator.

Similar to the stator 10 of the first embodiment shown in FIG. 1, the stator of the second embodiment includes a stator core 11 and a coil 12. The stator core 11 is formed by stacking a plurality of circular steel plates of approximately the same shape. When a steel plate is stacked, an adhesive is applied to a part of the surface of the steel plate to be opposed to the other steel plate. Therefore, a stator core 11 which is an aggregate of a plurality of steel plates stacked and fixed has a circular cylindrical shape.

Each steel plate constituting the stator core 11 is a plate-like member having an annular stator yoke 13, a plurality of teeth 14 projecting radially inward from the stator yoke 13 at equal intervals, and slots 15 formed circumferentially between the adjacent teeth 14 at equal intervals, which is formed by punching an electromagnetic steel plate or the like. When a plurality of steel plates are stacked, a plurality of slots 15 penetrating in the axial direction are formed in the stator core 11 at equal intervals in the circumferential direction. A coil 12 formed by winding wound around the teeth 14 is attached to the slot 15. A stator 10 to which the coil 12 is attached is fixed to the inner periphery of an approximately circular cylindrical housing not shown in FIG. 1.

Figure 3:
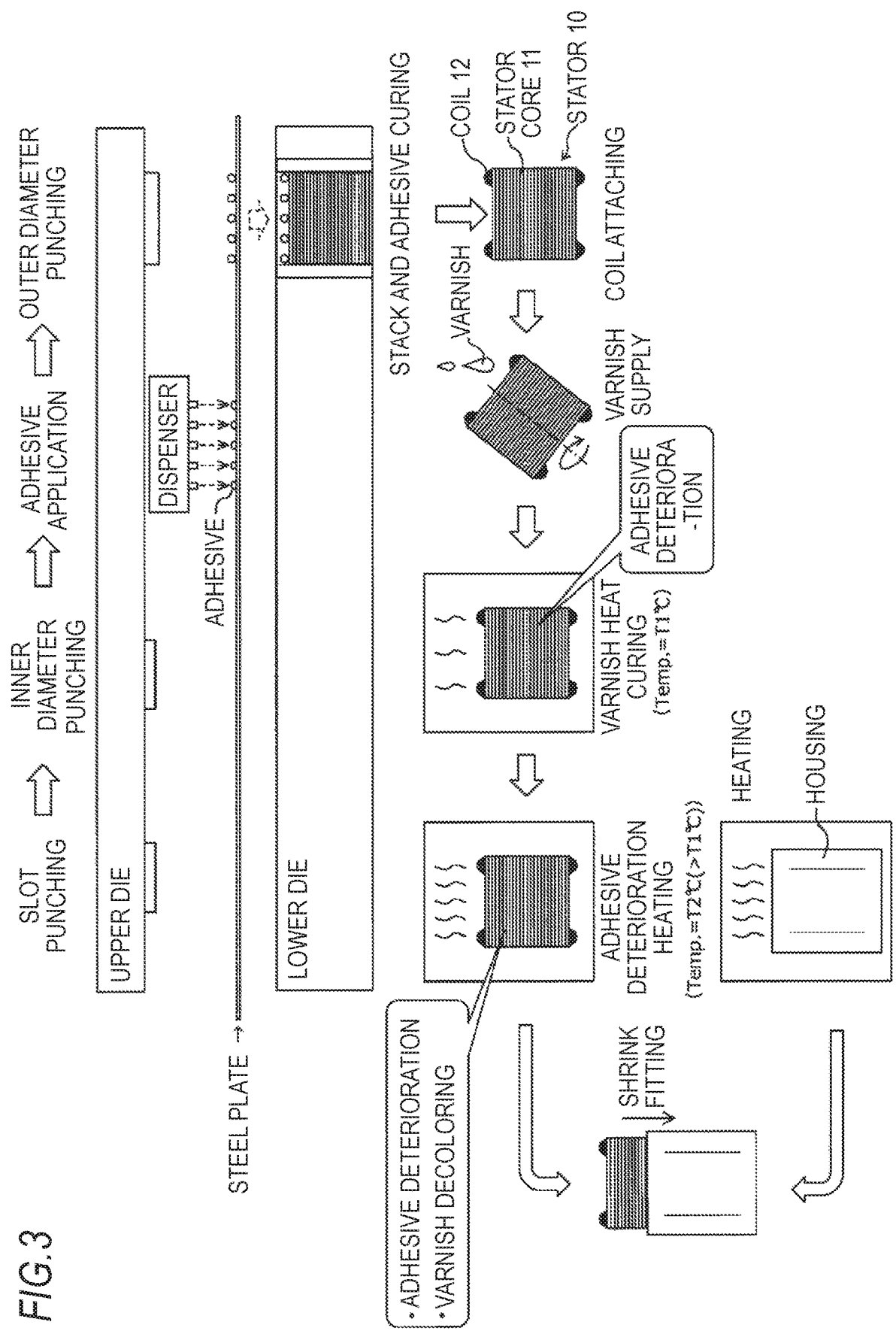
FIG. 3 is a schematic diagram showing steps when manufacturing a stator of a second embodiment.

FIG. 3 is a schematic diagram showing steps when manufacturing the stator 10 of the second embodiment. As shown in FIG. 3, a slot is formed by punching the steel plate before stacking, and after an inner diameter is formed, an adhesive is applied to a part of a surface to be opposed to the other steel plate. Thereafter, a circular steel plate with its outer diameter punched is stacked on the other steel plate. Next, the coil 12 is attached to the stator core 11 in which the predetermined number of steel plates are stacked, in this case, insulating paper or the like as well as the coil 12 may be also attached to the stator core 11. Varnish is supplied to the stator 10 to which the coil 12 or the like is attached. The varnish penetrates the empty space of the slot 15 between the windings of the coil 12 and the teeth 14, and a space between stacked steel plates constituting the stator core 11.

Thereafter, in order to heat cure the varnish, the stator 10 is heated to a high temperature T1° C. for a predetermined time. At this time, the adhesive between the stacked steel plates is deteriorated by heat, and adhesive strength is lowered. Next, the stator 10 positioned in the jig is heated for a predetermined time to a temperature T2° C. (T2>T1) higher than the temperature T1° C. at the time of curing varnish. By the heating temperature T2° C. at this time, the adhesive is deteriorated by heat, and the varnish is discolored in a case where insulating paper is attached to the stator core 11, the insulating paper is also discolored. Next, after heating the housing positioned in the jig, the stator 10 shrinks and fits to the inner diameter side of the heated housing.

In the present embodiment, the stack strength (rigidity) of the steel plate constituting the stator core 11 is adjusted by thermally deteriorating the adhesive applied to each steel plate. That is, in the steps of "vanish heat curing" and "adhesive deterioration heating" shown in FIG. 3, the stack strength of the stator core 11 which is an aggregate of the plurality of steel plates stacked and fixed is adjusted by lowering the adhesive strength by adhesive deterioration due to heat. When the stack strength of the stator core 11 is changed, the bending resonance frequency of the stator core 11 is changed. On the other hand, the ring resonance frequency of the stator core 11 is determined by the inner diameter, outer diameter and material characteristics of the stator core 11. In the present embodiment, the adhesive strength of the adhesive is lowered by thermal deterioration so as to obtain a stack strength expressing a bending resonance frequency of a value not overlapping with the ring resonance frequency of the stator core 11 where a predetermined number of steel plates are stacked. As a result, the ring resonance frequency of the stator core 11 does not overlap with the bending resonance frequency, so the resonance level of the stator 10 is suppressed and the quietness of the electric rotary machine is improved.

As described above, in the present embodiment, the bending resonance frequency of the stator core 11 is changed to a value not overlapping the ring resonance frequency, by thermally deteriorating an adhesive provided between stacked steel plates constituting the stator core 11. Thus, the stack strength of the stator core can be easily changed by an easy method such as thermal deterioration of the adhesive. That is, since the bending resonance frequency of the stator core 11 can be easily adjusted, the resonance level of the stator can be suppressed by a simple method. As a result, the quietness of the electric rotary machine can be improved.

The adhesive is thermally deteriorated not only by heating when the varnish is heat cured but also by heating at a temperature higher than the heating temperature when the varnish is heat cured. When the stator 10 is heated to a temperature higher than the heating temperature when the varnish is heat cured, not only the adhesive is deteriorated, but also the varnish is discolored. Therefore, the deterioration of the adhesive can be easily checked from the appearance of the varnish.

It is to be noted that the present invention is not limited to the above-described embodiment, but can be appropriately modified, improved, and the like.

What is claimed is:

1. A method for manufacturing a stator for an electric rotary machine including a stator core formed by stacking a plurality of steel plates and a coil attached to the stator core, the method comprising:
   forming the steel plates;
   forming the stator core by stacking and fixing the plurality of steel plates with an adhesive;
   attaching the coil to the stator core; and
   changing a stack strength of the stator core, by deteriorating the adhesive such that a bending resonance frequency of the stator does not overlap with a circular resonance frequency of the stator, the bending resonance frequency varying depending on the stack strength of the plurality of steel plates, the circular resonance frequency being determined by an inner diameter, an outer diameter, and material characteristics of the stator core.

2. The method for manufacturing a stator for an electric rotary machine according to claim 1, wherein
   in the changing the stack strength, the adhesive is deteriorated by a heating temperature when varnish supplied to the stator is cured by heat.

3. The method for manufacturing a stator for an electric rotary machine according to claim 2, wherein
   in the changing the stack strength, the adhesive is deteriorated by further heating the stator to a temperature higher than the heating temperature when the varnish is cured by heat.

* * * * *